C. E. SANFORD.
BALANCE WHEEL POISING AND TRUING MACHINE.
APPLICATION FILED APR. 21, 1916.

1,228,053.

Patented May 29, 1917.
2 SHEETS—SHEET 1.

Inventor
Charles E. Sanford
By his Attorney
Oscar Gill

C. E. SANFORD.
BALANCE WHEEL POISING AND TRUING MACHINE.
APPLICATION FILED APR. 21, 1916.
1,228,053.
Patented May 29, 1917.
2 SHEETS—SHEET 2.
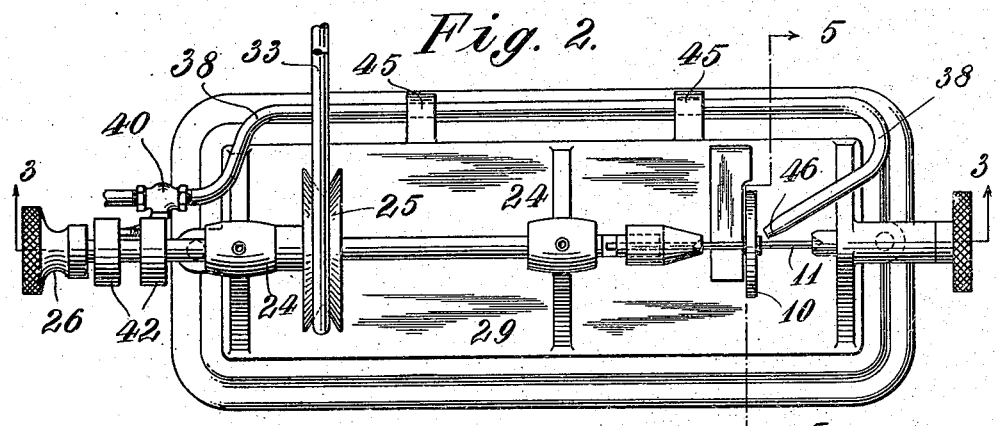
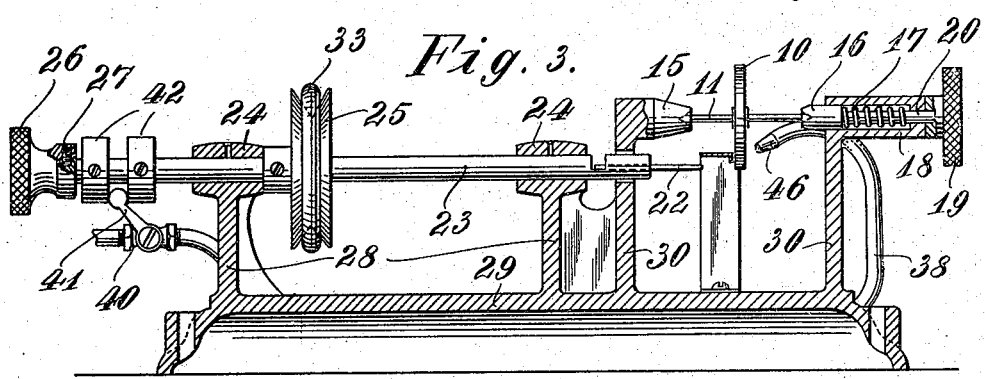
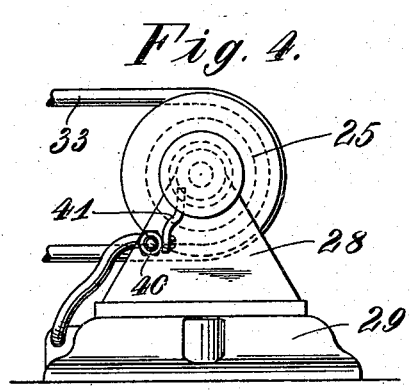 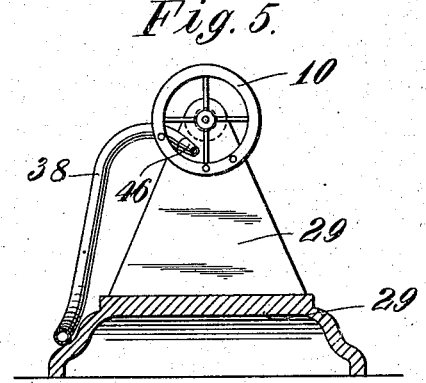
Inventor
Charles E. Sanford
By his Attorney
Oscar Giel

UNITED STATES PATENT OFFICE.

CHARLES E. SANFORD, OF NEW YORK, N. Y.

BALANCE-WHEEL POISING AND TRUING MACHINE.

1,228,053.    Specification of Letters Patent.    Patented May 29, 1917.

Application filed April 21, 1916. Serial No. 92,603.

*To all whom it may concern:*

Be it known that I, CHARLES E. SANFORD, a citizen of the United States, and a resident of New York, in the county of New York and State of New York, have invented certain new and useful Improvements in Balance-Wheel Poising and Truing Machines, of which the following is a specification.

This invention relates to improvements in balancing and truing wheels, and its principal object is to provide a mechanism in which the wheel to be trued may freely rotate allowing the heavy side to hang pendant through gravity.

Another object is to provide means for lightening the heavy portion of the wheel to such an extent as may be desired.

A further object is to provide means whereby the drillings or chips are removed without attention on the part of the operator.

These and other objects are attained by the novel construction and combination of parts hereafter described and shown in the accompanying drawings, in which:—

Fig. 2 is a plan view of the machine.

Fig. 3 is a vertical sectional view taken on line 3—3 of Fig. 2.

Fig. 4 is an end view of the same, looking from the control end, and

Fig. 5 is a sectional view taken on line 5—5 of Fig. 2.

Figure 1:
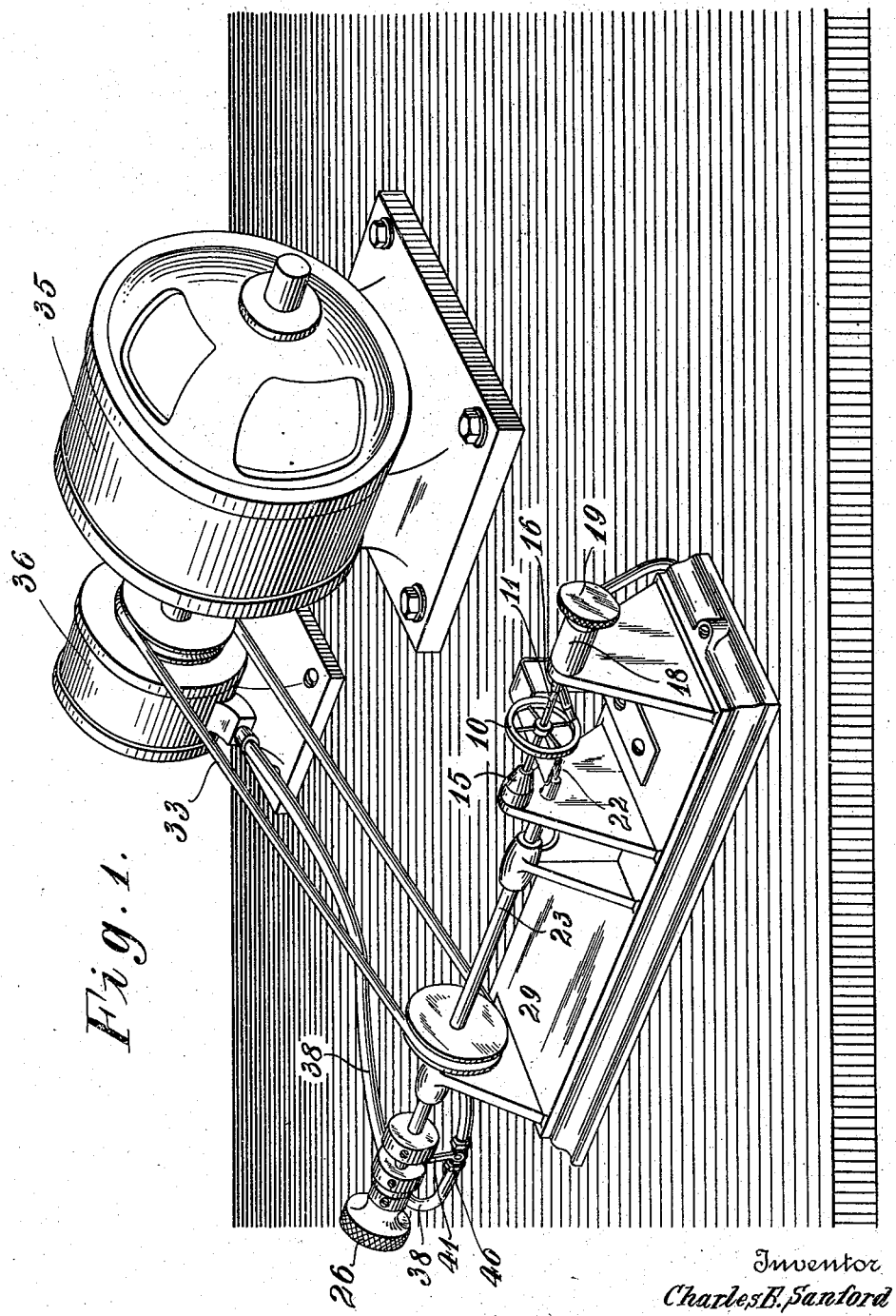
Figure 1 is a general perspective view of the apparatus, together with the power means employed.

In order to properly balance wheels of this character, it has been customary to place the same, or rather the shaft or stem passing through the wheels, upon V blocks or horizontal rails, agitating the wheel so that it is caused to oscillate, bringing the heavy portion vertically below the center.

Then after marking or otherwise determining the heavy point, the wheel is removed and filed or drilled to such an extent as to cause the same to be better balanced; these operations being continued until such time as the wheel action indicates that it balances.

In the present device the wheel, herein indicated by the numeral 10, is shown to be mounted upon a staff 11, the same having short conical points, one of which is seated in a hardened conical center 15, the other being received in a similar conical cavity formed in the slide 16, held normally forward by means of a spring 17 contained in a recess in the support 18, the knob 19 being positioned upon the stem 20 so as to retract the spring and liberate the staff 11 when desired.

It is to be understood that the tension of the spring 17 is only sufficient to hold the staff in its proper horizontal position, allowing it to rotate with entire freedom within the conical cavities in which it is mounted, until any initial momentum has subsided, leaving the weightiest part of the wheel rim directly below the points of support.

A drill 22, mounted in the end of a spindle 23 and rotatable within the bearings 24 by means of a pulley 25, may be forced against the rim of the balance wheel through the knob 26, held to the spindle 23 by a set-screw 27 entering into an annular recess formed near the end of the spindle so that the knob can be contained in the fingers of an operator as it is pressed outward without rotating.

The bearings 24 are supported by standards 28 rising from a base or platform 29 resting upon any convenient level surface, similar standards 30 supporting the inverted cone 15 and slide support 18 by which the wheel is carried.

The pulley 25 may be actuated by a belt 33 driven from any convenient rotative source, as a motor 35, conveniently located with reference to the base 29.

The motor may further drive a fan 36 or other arrangement adapted to provide a source of compressed air, the same being conveyed through the tube 38, in which is a valve 40, actuated by means of a lever 41, the free end of which is engaged between adjustable disks 42 secured to the spindle 23, one of the disks acting as a stop limiting the forward movement of the drill 42 when contact is made with the outer bearing 24.

The tube 38 may be secured to the platform 29 by suitable clips 45, its extreme end being raised and turned reëntrantly, ending in a nozzle 46, so disposed as to direct the air current passing through it in such manner as to blow away any chips which the drill makes when lightening the wheel rim, and it will be noticed that the valve is so arranged that the air current is closed when the drill is in an inoperative position, but opened when it is advanced to contact with the rim of the balance wheel.

While the foregoing presents an embodiment of the invention, it is not desired to be held strictly to the exact construction as shown, as minor modifications may be made without departing from the scope of the claims hereto appended.

Having thus described my invention, what I claim as new and desire to secure by Letters Patent, is:—

1. In a machine of the class described, the combination with horizontal supports for the staff of a wheel to be balanced, one of said supports being rigid and the other movable, of a spindle slidable in the plane of said supports, a drill carried thereby, means for rotating said spindle, and means for moving said drill relative to the rim of said wheel.

2. In a machine for balancing wheels, the combination with a pair of supports in which the shaft of said wheel may freely rotate in a horizontal plane, a drill slidable in a plane parallel to said supports, and positioned vertically therebelow, means for rotating said drill, and means for actuating said drill longitudinally.

3. In a machine for balancing wheels, the combination with a pair of supports, one of said supports being rigid, and the other resiliently mounted, said supports having means for engaging and disengaging the staff of a wheel, a drill mounted directly below said supports, parallel thereto, means for moving said drill axially, means for rotating said drill, a source of compressed air draft, means for conveying the air and discharging the same adjacent to the drill point when said drill is in a forward position, and means operative by the axial movement of said drill for opening or closing the air conveying means.

4. In a balancing machine, a pair of cupped supports receptive of the article to be balanced, and in which it freely rotates, a drill slidably mounted to register with the rim of the article, means for actuating said drill axially, means for rotating said drill, and means for blowing away the chips produced by said drill, the air draft in said blowing means being controlled by the axial movement of said drill.

Signed at New York, in the county of New York, and State of New York, this 14 day of April, 1916.

CHARLES E. SANFORD.

Copies of this patent may be obtained for five cents each, by addressing the "Commissioner of Patents, Washington, D. C."